United States Patent [19]

Bruno et al.

[11] Patent Number: 5,239,580
[45] Date of Patent: Aug. 24, 1993

[54] MODEM-TELEPHONE COUPLER

[75] Inventors: Andre Bruno, Saint-Jeannet; Jacques Fieschi, Saint-Laurent-du-Var; Jean Martin, Caghes-Sur-Mer; Remi Vautier, Nice, all of France

[73] Assignee: International Business Machines Corporation, Armonk, N.Y.

[21] Appl. No.: 779,774

[22] Filed: Oct. 21, 1991

[30] Foreign Application Priority Data

Dec. 5, 1990 [EP] European Pat. Off. ......... 90480204.8

[51] Int. Cl.⁵ .......................................... H04M 19/00
[52] U.S. Cl. ........................................ 379/443; 379/93
[58] Field of Search ................. 379/28, 443, 93, 94, 379/97, 99

[56] References Cited

U.S. PATENT DOCUMENTS

| 4,791,658 | 12/1988 | Simon et al. | 379/41 |
| 4,799,144 | 1/1989 | Parruck et al. | 364/200 |
| 4,987,586 | 1/1991 | Gross et al. | 379/93 |

FOREIGN PATENT DOCUMENTS

| 0309627 | 5/1989 | European Pat. Off. |
| 8100658 | 3/1981 | PCT Int'l Appl. |

Primary Examiner—Stafford Schreyer
Attorney, Agent, or Firm—Joscelyn G. Cockburn

[57] ABSTRACT

Coupling device for the connection of a Data Circuit Terminating Equipment DCE to a given Public Switched Telephone Network PSTN and to a local telephone set. The coupler includes means for providing said local telephone set with DC current whereby the microphone and the headphone of the telephone can be used respectively for transmitting and receiving vocal messages from the a DTE which is connected to said DCE. The invention also provides a DCE for the connection of a DTE to a a PSTN and to a local telephone set including a coupler circuit having the electronic components matching the electric requirements of a given PSTN. The coupler further includes means for providing the telephone set with DC current whereby vocal messages can be transmitted and received from the DTE to the telephone set. The invention further provides a DCE for the connection of a DTE to a PSTN and to a local telephone set which includes means for removably attaching a coupler circuit having the electronic components matching the electrical requirements of a given PSTN and further including means for providing the telephone set with DC current whereby vocal messages can be transmitted and received from the telephone set to the DTE.

17 Claims, 7 Drawing Sheets

COUNTRY CODE VALIDATION

OUT-GOING CALL

IN-COMING CALL

RING DETECTOR

MODEM-TELEPHONE COUPLER

TECHNICAL FIELD OF THE INVENTION

The invention relates to data transmission and particularly to data transmission between a data terminating equipment (DTE) and a public switched telephone network (PSTN).

BACKGROUND ART

Public Switched Telephone Networks (PSTN) are of major importance in the data transmission field since they can be used in order to communicate data from a first local data terminating equipment (DTE) to a second, remote, DTE. The attachment of a DTE to a telephone network requires a device known as a DCE or modem which particularly includes a coupler circuit for providing the adaptation of the electrical signals to the characteristics of the switched telephone network to which the DCE is likely to be connected.

With the development of sophisticated systems allowing the powerfull processing and use of vocal messages in data processing systems, a need has appeared in a device that allows the transmission of voice from a local telephone set to a data processing system via a DCE. However, coupler circuits which are known in the art does not allow that possibility since the local telephone set operates only when it is connected to the PSTN and consequently can not be used from transmitting voice messages through the DCE into the local DTE.

SUMMARY OF THE INVENTION

It is an object of the invention to provide a coupling device for connecting a DCE to a PSTN and which allows the transmission of voice messages between said DCE and the local telephone set.

It is another object of the invention to provide a coupling device which can be removably connected to a DCE for adapting the latter to the requirements of a specific PSTN and allowing the transmission of voice messages between said DCE and the local telephone set.

It is a further object of the invention to provide a coupling device which allows transmission of voice messages between the DCE and the local telephone set while providing a full galvanic isolation between both.

It is another object of the invention to provide a DCE which can be connected to a specific PSTN and which allows the transmission of vocal messages between a local telephone set to a DTE connected to the DCE.

It is a further object of the invention to provide a DCE interface card, for a personal computer system, to which a coupler circuit could be attached which allows the transmission of vocal messages between the local telephone set and the personal computer system.

It is a further object of the invention to provide a workstation which includes a DCE having a coupling device allowing the transmission of vocal messages inbetween the local telephone set and the workstation.

These and other objects of the invention are achieved by means of the coupling device according to the present invention which allows the connection of a DCE to a given PSTN and to a local telephone set. The coupling device includes means for providing said local telephone set with DC current whereby the microphone and the headphone of the telephone can be used respectively for transmitting and receiving vocal messages from the a DTE which is connected to said DCE.

In the preferred embodiment of the invention, the coupler consists in a box which can be removably attached to the DCE and which adapts the latter to the electric requirements of a given PSTN.

The invention also provides a DCE for the connection of a DTE to a PSTN and to a local telephone set including a coupler circuit having the electronic components matching the electric requirements of a given PSTN. The coupler further includes means for providing the telephone set with DC current whereby vocal messages can be transmitted and received from the DTE to the telephone set.

The invention further provides a DCE for the connection of a DTE to a PSTN and to a local telephone set which includes means for removably attaching a coupler circuit having the electronic components matching the electrical requirements of a given PSTN and further including means for providing the telephone set with DC current whereby vocal messages can be transmitted and received from the telephone set to the DTE.

The invention further provides a workstation such as a personal computer system which includes a DCE interface card to which can be removably connected a coupling device providing the telephone set with DC current whereby vocal messages can be transmitted and received from the latter telephone and the workstation.

DESCRIPTION OF THE PREFERRED EMBODIMENT OF THE INVENTION

Figure 1:
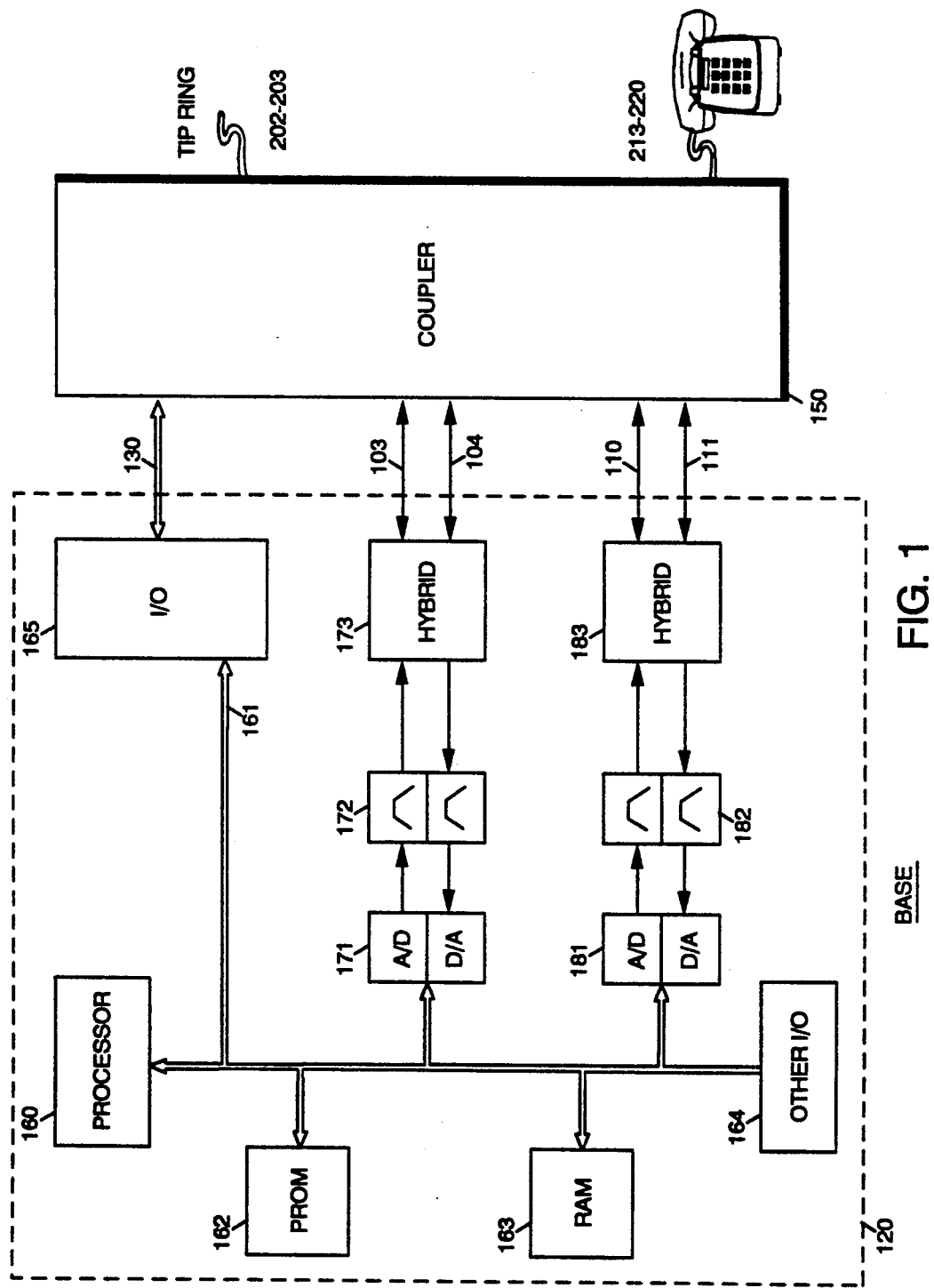
FIG. 1 is a view of the preferred embodiment of the invention.

FIG. 1 shows the preferred embodiment of the DCE according to the present invention which includes a base system 120 to which is connected to a coupler 150. Contrary to the base system 120 which is unique for a wide variety of PSTN, coupler 150 is specific to a determined PSTN and includes all the hardware components which are necessary to comply with the electrical requirements of the considered PSTN. In the preferred embodiment of the invention, coupler circuit 150 takes the form of a box which can be removably attached to base 120 by means of a multiconductor cable. Base circuit 120 consists in an interface card which is intended to be connected to a workstation such as a personal computer operating as a DTE transmitting and receiving data via a switched telephone network in accordance with the requirements of a specific country. It should be however noticed that the invention concerns any type of DCE, taking the form either of interface cards or of a stand-alone DCE. In one particular embodiment, base circuit 120 is included into a portable personal computer system and coupler circuit 150 is a box which is connected to the latter portable system. Coupler 150 particularly provides, as will be detailed hereinafter, the electrical adaptation to the electrical requirements of the telephone network of a specific country. Base card 120 includes a processor 160 which is connected via a bus 161 to a PROM storage 162, to a RAM storage 163, to Input/Output (I/O) blocks 165 providing the communication between coupler 150 via bus 130 and other I/O devices 164 which are not part of the invention. Processor 160 communicate with an hybrid 173 (resp. 183) via a block of A/D and D/A converter 171 (resp. 181) and pass-band filters 172 (resp. 182). Hybrid 173 or 183 is a two-wires/four-wires well known in the data communication art. Hybrid 173 (resp. 183) communicates with coupler 150 via a set of two wires 103–104 (resp. 110–111). As mentioned above, processor 160 in base card 120 controls coupler 150 by means of bus 130 which is connected to I/O circuit 165. Bus 130 consists in the following leads:

lead 100: off-hook
 lead 101: dial pulse
 lead 104: dial loop
 leads 105–108: identification leads
 lead 109: SW hook
 lead 112: hand-set I/O The function of those leads will be better understood with respect to the hereinafter description. It should be noted that base circuit 120 further provide coupler 150 with positive Vcc and ground potentials, the latter potential being particularly used for local feeder circuit 219 as will be described hereinafter. The connection of the coupler circuit 150 to the base 120 is achieved by means of a plug which can receive a multiconductor cable.

PROM storage 162 stores the software program which is required for performing the instructions detailed hereinafter with respect to the flow chart of FIGS. 3–6. PROM 162 further includes a set of PSTN tables in which are stored parameters characterizing the different telephone networks existing in different countries to which is likely to be connected the DCE according to the invention. The latter PSTN tables particularly includes information relative to the range of frequencies of the signal on the telephone lines, information relative to the different signalling tones characterizing a specific PSTN. Those PSTN tables which are stored into a PROM storage into the preferred embodiment of the invention can also be loaded into RAM storage 163, from any other storing devices such as a 3.5 inch-diskette devices which is connected to the DTE (particularly in the case when the DTE is a personal computer).

Figure 2:
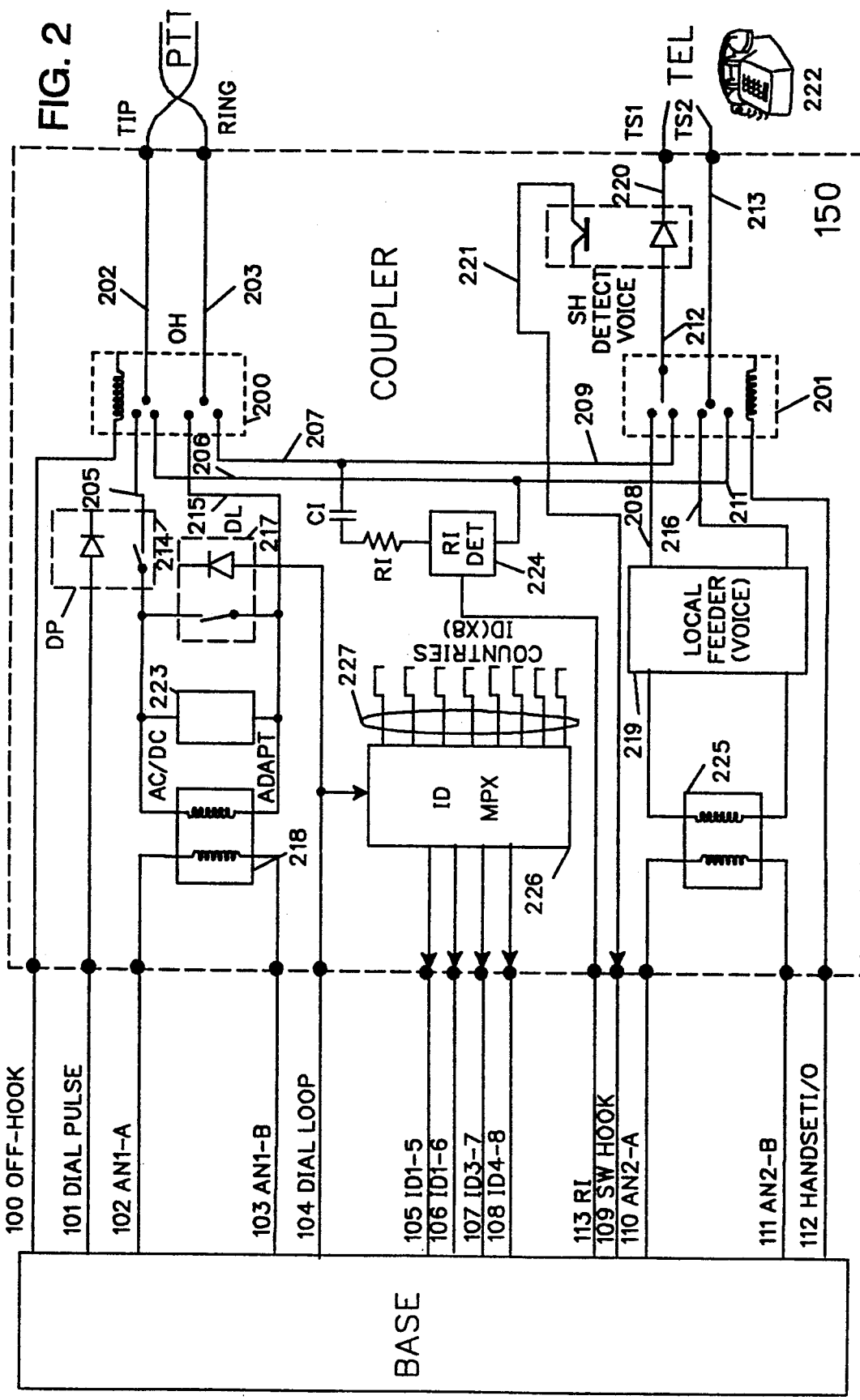
FIG. 2 illustrates the coupler which is attached to the base card of the DCE.

FIG. 2 illustrates the preferred embodiment of the coupler 150 according to the present invention. Coupler 150 is connected to the 'tip-ring' leads of the PSTN considered, the latter 'tip-ring' leads being connected to a off-hook relay 200 which performs the connection of the base card 120 to the PSTN network under control of processor 160. More accurately, 'tip-ring' leads are connected to the two input leads 202 and 203 of switch 200. Relay 200 has a third input lead 205 which is connected to a DIAL-pulse circuit 214, a lead 206 which is connected to an input lead 211 of a 'Hand-set IO' relay 201, which switch 201 being under control of processor 160 via control lead 112. Relay 200 has a further input lead 215 which is connected to the secondary winding of transformer 218. At last Relay 200 has a input lead 207 which is connected to an input lead 209 of relay 201. Relay 201 has inputs leads 208 and 216 which are connected to a local feeder voice circuit 219, the operating of which will be described hereinafter. Input leads 212 and 213 of relay 201 are respectively connected to a Telephone-Set1 (Ts1) lead 220 via a switch-hook detector circuit 221 and to a Ts2 lead 213. Relay 200 provides the OFF-HOOK function well known in the telecommunication art. Whenever processor 160 sets leads 100 and 112 to a low level, 'tip-ring' leads of the PSTN network are connected directly to the telephone set via relay 200, relay 201 and SH detector circuit 221. Whenever the user hand-sets the telephone, a flow of current appears at leads 220–213, the latter flow of current being detected by SH detector circuit 221 (being a photocoupler in the preferred embodiment of the invention) and transmitted to processor 160 via lead 109.

When processor 160 wishes to transmit data to the PSTN, it activates lead 100 and 101 to connect the secondary winding of transformer 218 to 'tip-ring' leads via relay 200 and a DP circuit 214. DP circuit 214 performs a decadic pulsing as described hereinafter. To achieve this, processor 160 transmits a succession of break-makes signals via lead 101 to DP circuit 214 which accordingly opens and closes the electrical circuit. It should be noticed that the cadence of those break-make signals strongly depends on the specific PSTN considered, and the corresponding parameters allowing a connection of the DCE to a large number of PSTN, are stored into the above mentioned tables.

A dial-loop circuit 217 is connected in parallel on the secondary winding of transformer 218 and provides the short-circuit of the latter when the processor generates break-make signals on lead 101. To achieve this the processor activates a dial-loop lead 104 which is connected to the control input of DL circuit 217. In the preferred embodiment of the invention dial-loop circuit 217 is a photo relay circuit. The PSTN tables stored into PROM storage 162 includes information relative to the period during which DL circuit 217 performs a short-circuit of the secondary of transformer 218, the latter period being a characteristic of the specific PSTN considered.

A circuit 223 for adapting the impedance is connected in parallel between the secondary leads of transformer 218. The latter circuit is used for fixing to a determined value, depending on the considered PSTN, the apparent impedance 'seen' from the telephone line. Transformer 218 is an usual transformer which can be used in traditional couplers for achieving a galvanic isolation between base card and the telephone line. Between leads 206 and 207 is connected a circuit consisting of a capacitor Ci in series with a resistor Ri also in series with a RI detector circuit 224. RI detector 224 is used for detecting the ring voltage and activates Ring Indicate (RI) lead 113 accordingly. The activation of RI lead 113 can be detected by processor 160 via I/O circuit 165 (FIG. 1) which then executes tests in order to make sure that the RI signals which have appeared on lead 113 fully comply with the requirements of the specific PSTN to which is connected the DCE. The latter tests will be particularly described with respect to the 'incoming call' flowchart of FIG. 5 and to the ring detection process of FIG. 6.

The leads 208 and 216 of relay 201 are connected to a secondary winding of a transformer 225 via local-feeder circuit 219. Transformer 225 has its primary winding connected to leads 110 and 111 and therefore achieves the galvanic isolation between the base card and the telephone set. It should however be noted that in the case when the latter isolation is not required, transformer 225 can be omitted. Local-feeder circuit 219 provides the telephone set with DC current and therefore allows its operating in the case when control processor activates lead 112. Local-feeder circuit will be described in detail with respect to FIG. 7A and 7B. The coupler 150 further includes a multiplexer 226 which has 8 input leads connected to a 8-bits bus 227 carrying a wired 8-bits identification code. That identification code characterizing the specific PSTN to which is adapted coupler 150, can be read by control processor 160 via the four leads 105–108. Multiplexer 226 has a control lead which is connected to dial-loop lead 104. When processor 160 activates lead 104, multiplexer 226 transmits the 4 Most significant bits of the identification code to leads 105–108. Conversely whenever control processor sets lead 104 to a low level, the Least significant bits of the identification code are transmitted to leads 105–108. Therefore, after a sequence of two read operations of leads 105–108, processor 160 derives the identification code of coupler 150 and therefore the type of PSTN to which it can be connected. As will be described with more details hereinafter, one the identification code has been recognized by processor 160 in an initialization step, the latter processor loads RAM storage 163 with the appropriate parameters corresponding to the specific coupler which is attached to base 120. It should be noticed that, for economy purpose, the coupler 150 should be as simple as possible and should only includes the hardware components which are required for matching the electrical requirements of the considered PSTN. Particularly, the interface bus 100–112 between base system 120 and coupler 150 should be as simple as possible. This is firstly achieved by using the same lead 104 for controlling multiplexer 226 in the initialization step and also for controlling Dial-loop circuit 217. The advantageous use of the same lead 104 for two control purpose does not jeopardize the operating of the multiplexer 226 and DL circuit 117 since the reading step of the identification code of coupler 150 takes place in an initialization period occurring after the power-on of the machine while the control of DL circuit 117 is effective only after that initialization period. As a matter of fact, as long as processor 160 does not communicate through the PSTN, telephone set 222 is connected to the network since leads 100 and 112 are at a low level. Consequently, the short-circuit appearing at the secondary winding of transformer 218 during the initialization period caused by processor 160 which has activated lead 104 in order to read the 4 MSB of the identification code, does not affect the PSTN network. The simplicity of the interface between base system 120 and coupler 150 is still achieved by means of multiplexer 226 which allows the transmission of a 8-bit code through only 4 leads 105–108.

Figure 3:
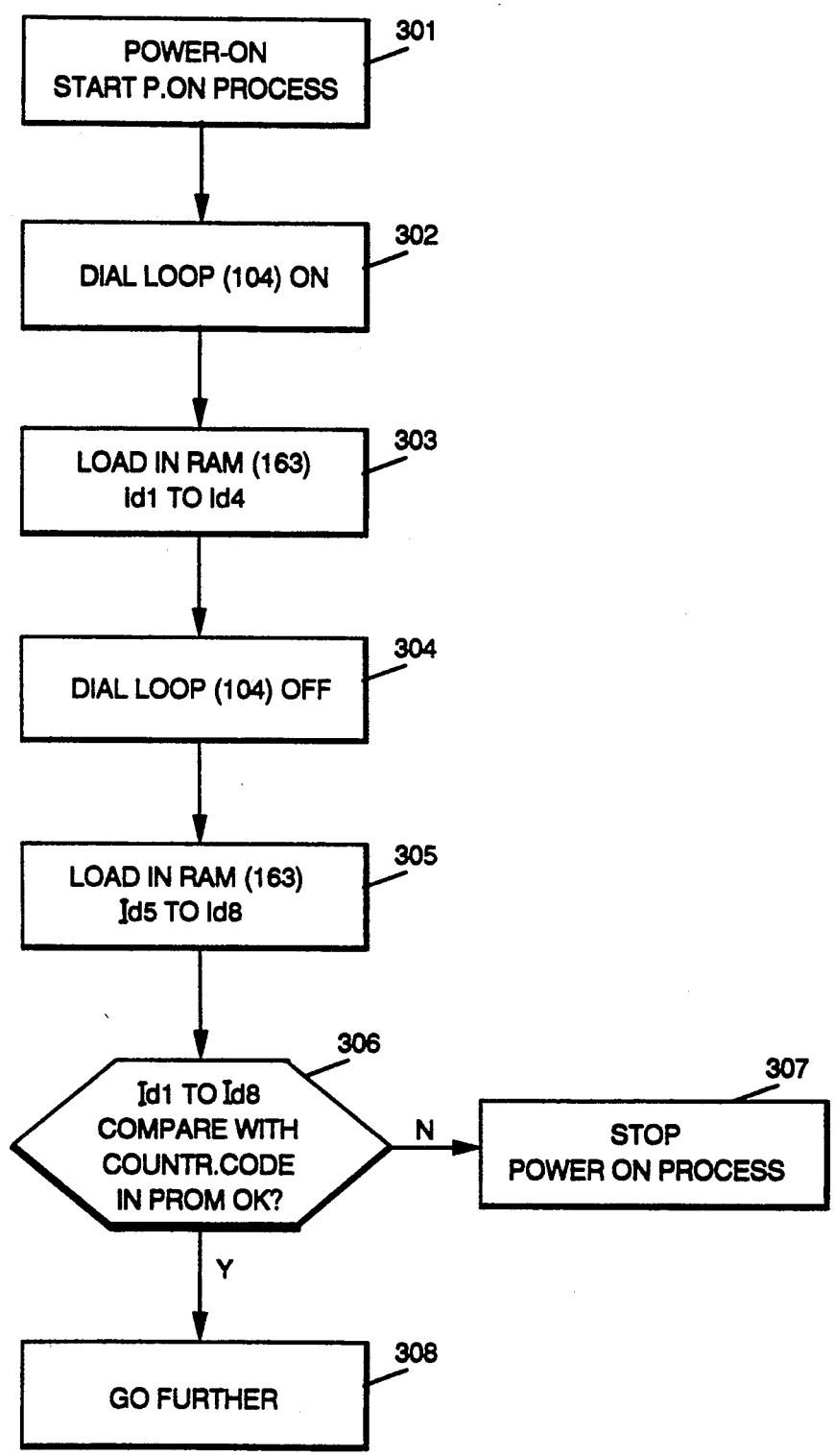
FIG. 3 shows a flow chart of the country code validation process in accordance with a preferred embodiment of the invention.

FIG. 3 particularly describes the country code validation step involved in the initialization period mentioned above. After the power-on of the machine, the base system 120 included into the DCE performs a power-on sequence which particularly consists in the internal tests of the major features of the machine, step 301. Then, step 302, processor 160 activates via I/O circuit 165 lead 104, what results in a first effect of performing a short circuit at the secondary of transformer 218 and also the transfer of the 4 MSB of the identification code to leads 105–108. As mentioned above, since transformer 218 is not connected to the PSTN, the latter short-circuit does not affect the operating of the network. Step 303, processor 360 loads the 4 MSB into RAM storage 163. Then step 304, processor 160 disactivates lead 104, what entails the transfer of the 4 LSB of the identification code to the leads 105–108, and also the suppression of the above short-circuit. The LSB are then stored into RAM 163, step 305. Then, step 306 processor 160 compares the full 8-bits identification code which has read from multiplexer 226 to the list of identification codes which are available into PROM 162, and each corresponding to a specific PSTN, to which the DCE is likely to be connected via coupler 150. If the code read from coupler 150 does not match one code of the above list stored into PROM 162, then processor 160 stops the power-on process and maintains lead 100–112 to a low level in order to prevent the connection of base system 120 to the PSTN. On the contrary, in the case when the code read from coupler 150 is recognized, processor 160 loads from PROM 163 into RAM 162, the parameters which are characteristics of the recognized PSTN such as the characteristics of the dial tone, the ring, etc As will be better understood in the description above, the latter parameters which are characteristics of the specific PSTN, to which is adapted coupler 150, includes tests parameters in particularly for the dial tone, the ring detection.

Figure 4:
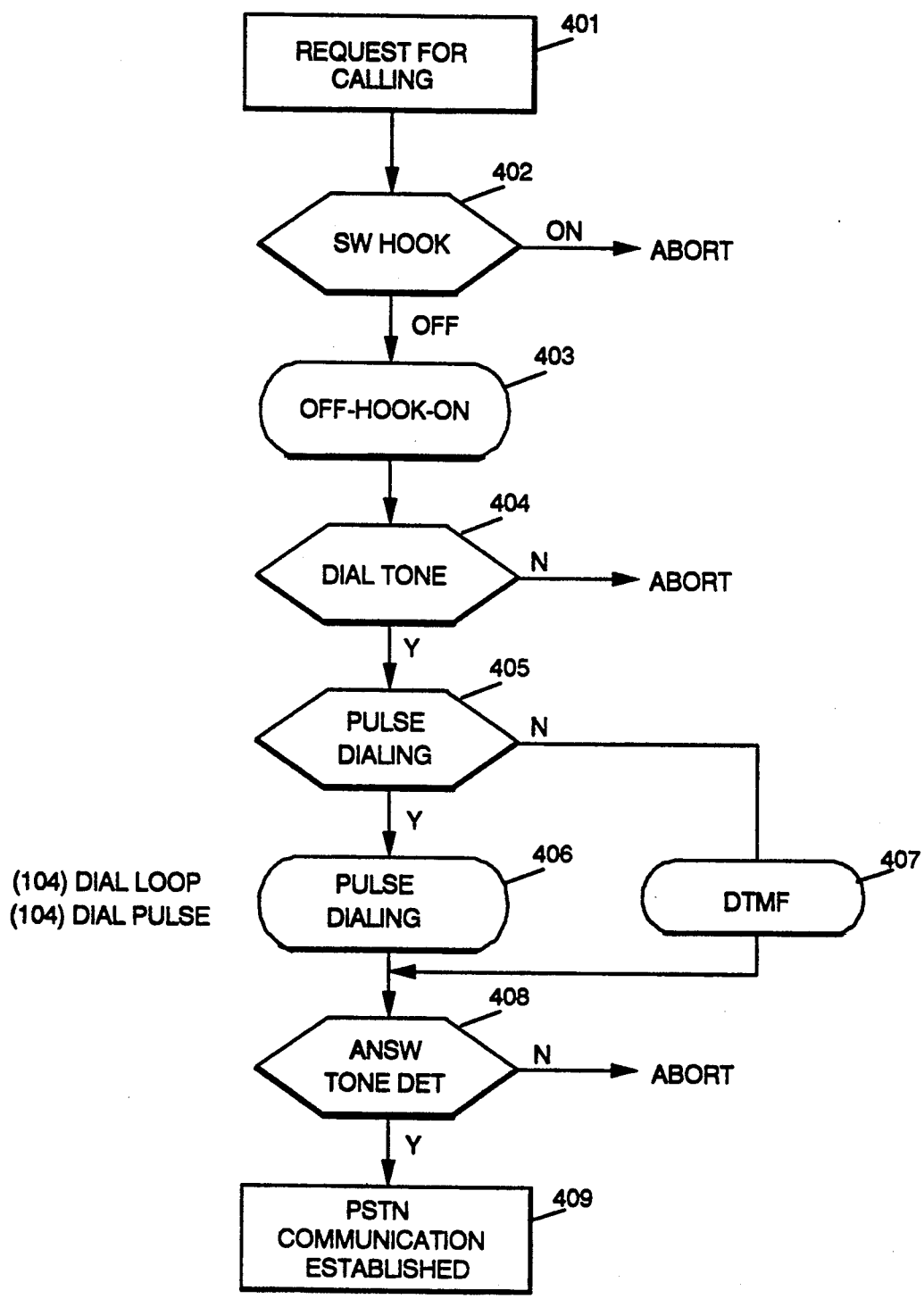
FIG. 4 details a flow chart of the process relative to an out-going call.

FIG. 4 illustrates an out-going call process. The process is initiated with a request from the attached DTE, or from the user or application program running into the personal computer in which is plugged the base card 120, step 401. Step 402, processor 160 tests the status of SW hook line 109. If the latter line is active, in the case when a user is communicating with the telephone set 222 through the PSTN network, the request is aborted and the application program is informed. In the reverse case, the PSTN is available for a communication session and processor 160 goes to step 403 where it activates off-hook lead 100. Then processor 160 goes to step 404 where it waits for the appearance of a dial tone on the telephone line on leads 202, 203. The dial tone is transmitted via converters 171, filters 172 and hybrid 173 to processor 160. Processor 160 then performs a digital signal processing on the received dial tone in order to determine its frequency, its duration, its amplitude. Once the latter values have been measured by processor 160, those are compared with values stored into the PSTN tables stored into RAM 162 and which have been loaded with appropriate parameters value after the identification of the coupler 150. Generally speaking, the PSTN tables loaded into RAM 162 consist in ranges of values which corresponds to a specific PSTN. For example, in the case of France, the dial tone received by processor 160 should have a frequency comprised between 406 and 474 Hz. The processor 160 is therefore able to determine whether the received dial tone fully complies with the requirements of the specific PSTN connected. If the measured values do not match the characterizing parameters stored into the mentioned PSTN tables, what may occur in the case when the PSTN is in a failure state or still in the case when the user has plugged a wrong coupler 150 (e.g. a coupler not designed for the specific PSTN), the process is then aborted and the leads 100–112 are maintained to a low level thus preventing any communication between base card 120 and the PSTN. In the reverse case, the process proceeds to step 405 where processor 160 reads into PSTN tables stored into RAM 160 whether a decadic or DTMF pulsing is required. If a decadic pulsing is required then processor 160 performs a succession of activation and disactivation of lead 101 in order to generate the appropriate break-make signals. Simultaneously to the pulsing, processor 160 activates DL lead 104 in order to perform a short circuit at the secondary winding of transformer 218. The PSTN tables stored into RAM 162 contain parameters defining the sequencing of the activating and disactivating of dial-pulse lead 101 which fully comply with the considered PSTN. On the contrary, if a DTMF pulsing is required then processor 160 goes to step 407 where it generates the appropriate tones on leads 102-103 to the PSTN, the latter appropriate tones being generated in accordance with parameters (frequency, duration) depending on the specific PSTN and stored into the above mentioned tables. Step 408, processor 160 waits for an answer tone having characteristics complying with the parameters stored into the above mentioned PSTN tables. If an answer tone has been detected, then processor 160 goes to step 409 which completes the process of establishment of the out-going call. From that instant, the base card 120 of the DCE according to the present invention is ready to communicate with a remote DCE via the PSTN.

Figure 5:
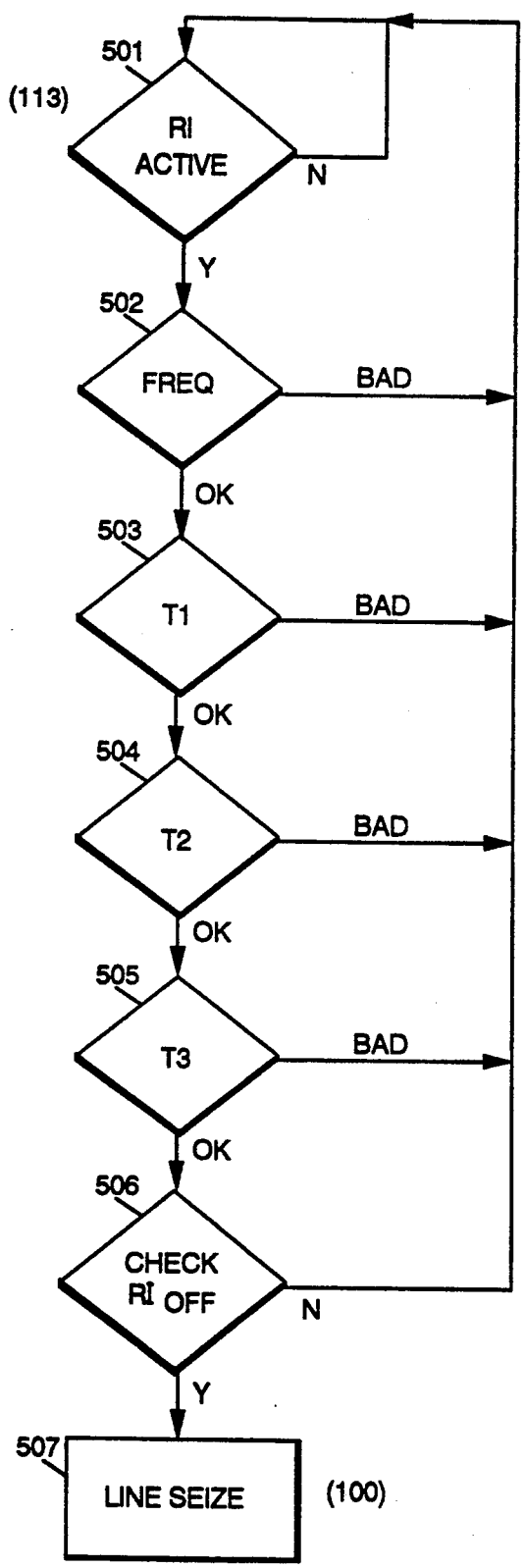
FIG. 5 details the process relative to a incoming call.
Figure 6:
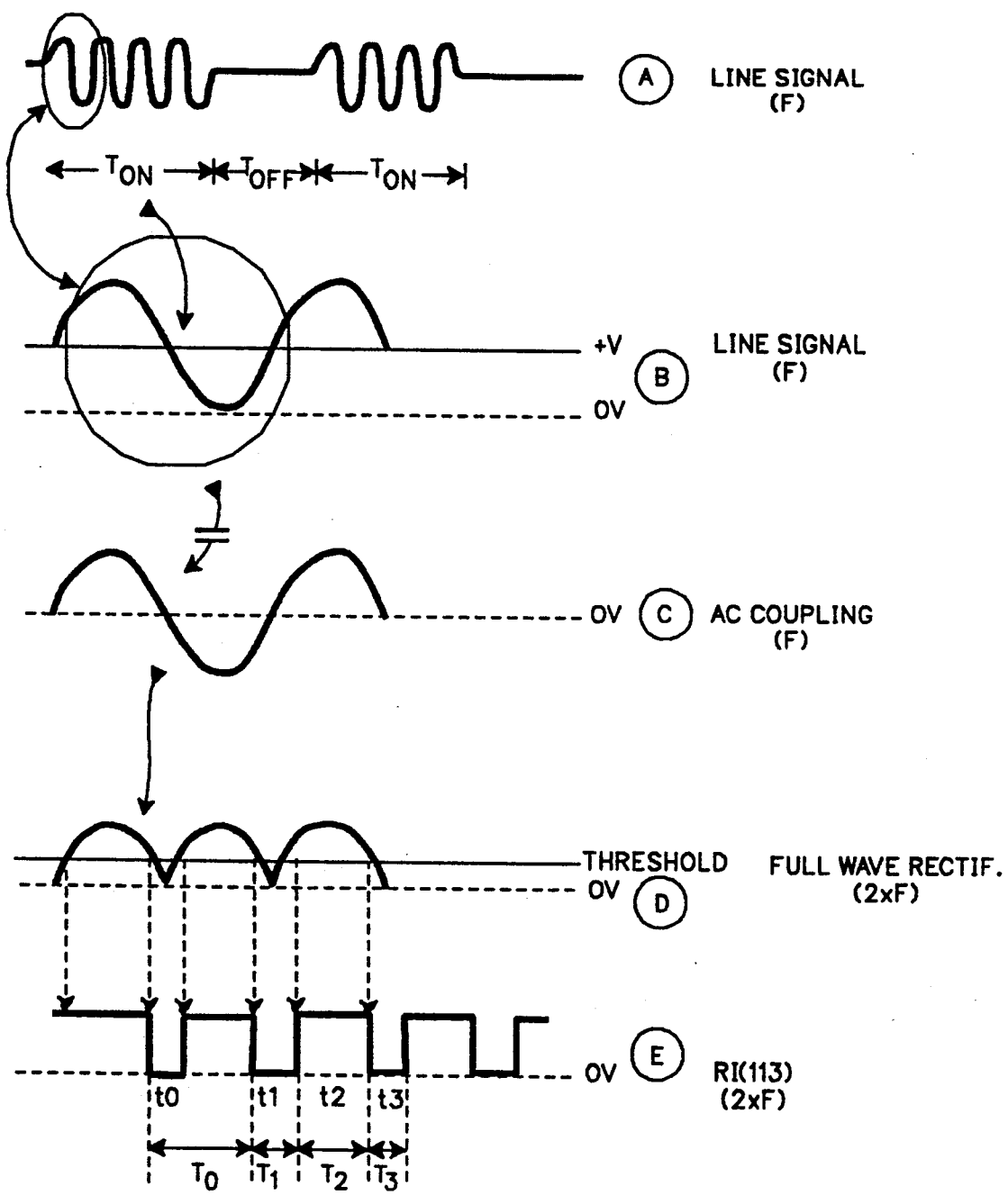
FIG. 6a to 6d are views illustrating the ring detector process.

FIGS. 5 and 6 illustrate the incoming call process that is to say the procedure which is carried out by the DCE in order to analyze a ring signal in accordance with the requirements of a specific PSTN. The ring signal appearing on the telephone line at the input of ring detector circuit 224 is illustrated with respect to FIGS. 6A and consists in a succession of bursts appearing during Ton period and separated by silences having a period Toff. An elementary sinusoide wave is detailed in FIG. 6B. Ring detector circuit 224 has a first function of suppressing the DC component of the signal, as illustrated with respect to FIG. 6C. Ring detector circuit performs a full-wave rectifying operation on the signal of FIG. 6C in order to provide a rectified signal such as illustrated in FIG. 6D. The signal is then compared with a threshold value depending on the characteristics of the PSTN. That particularly shows that the design of RI detector 224 and more generally the electronic components included therein, closely depends on the specific PSTN to which the coupler 150 is intended to be connected, that specific PSTN being defined by the identification code wired on bus 227. On the contrary, base system is unique for all PSTN considered. The adaptation of base card 120 is achieved by loading RAM 163 with appropriate parameters stored into PROM 163, those parameters corresponding to the identification code read from coupler 150 during the initialization period described in reference with FIG. 3. The comparison of the rectified signal to the above threshold provides a squared wave signal on RI lead 113 illustrated in FIG. 6E. Then processor 160 performs an analysis of the latter signal shown in FIG. 5 in order to determine the validity of the detected ring signal. The analysis of the signal first begins step 501 by a test in order to detect the appearance of a negative transitions on RI lead 113. At the appearance (t0) of a negative transition, processor 160 performs a measure of the frequency of the squared wave signal on lead 113, step 502. To achieve this, processor 160 waits for the next negative transition appearing, if so, at t1 in order to measure the period T0=t1−t2 between the two first negative transitions. From the measure of T, processor 160 estimates the value of the frequency of the ring signal and compares it to the range loaded into the PSTN tables which were loaded at the initialization step of FIG. 3. If the latter estimation of the ring frequency is not comprised between the minimum and the maximum value authorized in the table corresponding to the PSTN connected to the DCE, processor 160 proceeds to step 501. In the reverse case, processor 160 goes to step 503 where it measures the period T1 separating the instant t1 and the occurrence t2 of the following positive transition. Then, step 503, processor 160 checks whether the latter measured period T1 is comprised within the range of values stored into the PSTN table located into RAM 163. If T1 is comprised between the minimum and maximum authorized values T1min and T1max, then processor 160 goes to step 504. In the reverse case, the ring signal is considered invalid and the process goes back to step 501. Step 504, processor 160 performs a measure of the period T2 separating the instant t2 with the occurrence t3 of the following negative transition and tests that measured value. If the latter value is found to be comprised within a range of authorized values T2min and T2max, then the process proceeds to step 505, otherwise processor 160 goes back to step 501. Then processor 160 performs a next measure consisting in the measure of the period T3 separating the instant t3 with the occurrence of the following positive transition t4. If the measured value T3 is found to be comprised within a range of authorized values T3min and T3max, then the process proceeds to step 506, otherwise it proceeds to step 501. The successive testing of the measured values T1, T2 and T3 therefrom permits the DCE to be largely insensitive to the noise which is likely to appear at the input of ring detector 224. In order to improve the immunity to the noise, ring detector circuit 224 also includes a Schmidt trigger (not shown in the FIG. 2). Step 506, processor 160 performs the continuous measure of the period corresponding to a low level of the squared wave signal on lead 113 in order to detect the beginning of a silence period Toff as shown in FIG. 6A. For that purpose, processor 160 compares that measured period during which the signal on lead 113 is at a low level to a second predetermined threshold value loaded into the tables in RAM 163. Whenever, the measured period is equal to that second threshold, processor 160 performs the seizing of the line by activating leads 100 and 101, step 507. That second threshold value is chosen so that to make sure that the seizing of the telephone line will be performed approximately near middle of the Toff period corresponding to a silence of the ring signal. It has been noticed that the seize of the line during a Ton period corresponding to the existence of energy on the telephone line might cause great damage to coupler 150 and particularly to transformer 218. It is therefore essential to make sure that the seize of the telephone line will not occur during the existence of energy on the line. That is achieved in the coupler according to the invention by comparing the period corresponding to a low level of signal 113 to the second threshold which is stored into the tables in RAM 163 which correspond to the identification code of the coupler and have been loaded during the initialization step of FIG. 3. Since in France, two consecutive rings are separated by a silence of approximately 3 seconds, the second threshold value loaded into the RAM 163 and corresponding to the French PSTN is chosen to be equal to 1 second.

Coupler 150 according to the present invention permits the use of the telephone set 222 in different modes. In a first mode, the telephone set is used as traditionally, in order to transmit and receive voice messages through the PSTN. In a second mode, coupler 150 permits the transmission of voice from the telephone set 222 to the base card 120 while processor 160 is in a data communication session through the PSTN network. In that second mode, the voice is concurrent to the data transmission via leads 202-203.

The first mode is achieved by means of the deactivation of leads 100 and 112. Therefore the telephone set 222 is connected to the PSTN network via relays 200 and 201. In this 'on-hook' mode, the telephone set 222 can be used by an user for transmitting voice through the PSTN.

The second mode, or 'Off-hook' is achieved by activating leads 100 and 101 and deactivation lead 112. This carries out the connection of leads 102/103 to the telephone network via transformer 218, circuit 223, DL circuit 217, DP circuit 214 and relay 200. By transmitting digital data to D/A converter 171, and conversely by processing the digital data received from A/D converter 171, processor 160 is able to exchange data with a remote DTE or transmit and receive an analog signal with a remote telephone set.

In a third mode, called 'voice recording local communication mode', telephone set 222 is used for transfering voice into base card 120 at the same time that a possible data communication is occurring between the DCE and a remote DCE through the PSTN. For this purpose, processor 160 activates lead 112, that entails the connection of the telephone set to the local feeder 219 and to the transformer 225 via relay 201. Local feeder circuit 219 provides telephone 222 with a continuous DC current, being approximately equal to 20 milliamperes in the preferred embodiment of the invention. The microphone of the telephone set 222 can thus be used for generating an analog electrical signal which is transmitted via relay 201, circuits 219 and 225 to leads 110 and 111. The analog signal existing on leads 110 and 111 is then transmitted to hybrid 183, then filtered by circuit 182 and converted into digital words by means of A/D circuit 181. The digital samples appearing at the output of the A/D converter 181 are then available on bus 161 and are stored into RAM 163 by processor 160 for further processing. Conversely, processor 160 can read data located into RAM 163 and transmit them to digital-to-analog converter 181 via bus 161. The analog signal is then filtered by filter 182 and transmitted via hybrid circuit 183 to leads 110 and 111. The vocal message are transmitted to the telephone set 222 via relay 201 since lead 112 is activated.

In a fourth mode, processor 160 transmits differed data which have been stored into RAM 163 while in the above second mode, the latter data consisting of a digitalized vocal message which is intended to be transmitted to a remote telephone set. For that purpose, processor 160 initiates an out-going call such as described above with respect to FIG. 4. When the communication is established, processor 160 transmits the digitalized vocal message to D/A converter 171 via bus 161. The digitalized message is converted into analog form, filtered by filter 172 and then transmitted to hybrid circuit 173. Since leads 100 and 101 are activated, the vocal message is thus transmitted to the remote telephone set via relay 200 and the PSTN. It should be noticed that the DCE according to the present invention can be used for achieving the routing an incoming call to a remote telephone set. For this purpose, processor 160 activates leads 100 so that the vocal message is transmitted to transformer 218 via relay 200. The analog signal appearing at leads 102/103 is then transmitted to hybrid 173, then to filters 172 and then to A/D converter 171. The digital samples are then directly stored into RAM 163. Once the vocal message has been entirely stored, at the detection of the end of the communication by processor 160, the latter processor initiates an outgoing call process in order to establish a communication with a determined remote telephone set. The telephone set to be called is identified by identification data which have also been stored into RAM 163, either by the user or by the application program in the case when the DCE is used as an interface card for a personal computer. The establishment of the communication with the determined telephone set is carried out in accordance with the procedure which is described with respect to FIG. 4. Once the communication is established with the remote telephone set, processor 160 unloads the digitalized samples from RAM storage 163 to D/A converter 171, filter 182 and hybrid 183 which restitute the analog vocal message on leads 202/203. Since processor 160 has activated leads 100 and 101, the analog vocal message is transmitted to the remote telephone set via relay 200 and the PSTN. Therefore, the DCE according to the present invention can be used as a rerouter of telephone calls from a remote telephone set to another remote telephone set.

It should be noticed that the DCE according to the invention can provide the user or the application program (in the case when the DCE is embodied as an interface card for a personal computer) with a test routine which permits the entire check coupler 150. For this purpose, a external loop is performed by connecting 'tip-ring' leads 202 and 203 to leads 213 and 220. Once the external loop has been established, processor 160 activates leads 100, 101 and also lead 112. Therefore, the local feeder circuit 219 provides block 223 with DC current. Then processor 160 generates a test pattern to leads 102/103 via D/A circuit 171, filter 172 and hybrid 173. The analog signal corresponding to the test pattern is then transmitted from transformer 218 to the 'tip-ring' leads 202/203 via circuits 223, 214 and relay 200. The analog signal is then transmitted back to leads 110 and 111 via relay 201, local feeder 219 and transformer 225. The analog signal is then converted back to digital samples by A/D converter 181 and the corresponding received test pattern is stored into RAM 163. Processor 160 then performs a comparison between the transmitted and the received test pattern in order to determine a potential failure in one of the components of coupler 150, and in case when the DCE according to the invention is embodied as an interface card for a personal computer, reports the failure state to the user or the application program.

Figure 7A:
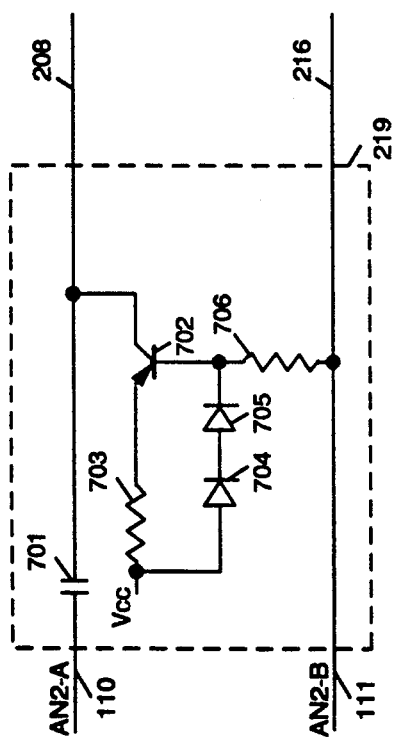
FIGS. 7A and 7B are views of preferred embodiments of local feeder circuit 219.
Figure 7B:
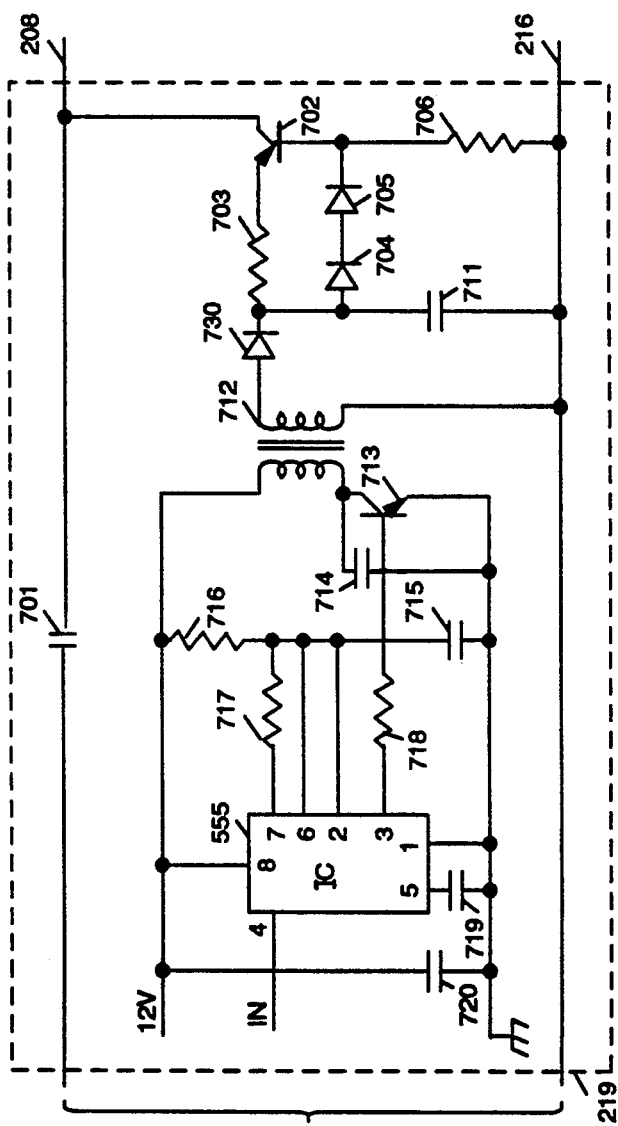

FIGS. 7A and 7B shows illustrative embodiments of local feeder circuit 219.

In a first preferred embodiment of FIG. 7A, which is used when no galvanic isolation is required between base circuit 120 and the telephone set 222, local feeder circuit 219 includes a capacitor 701 for preventing the DC current provided by a current source based on a PNP transistor 702 from flowing through leads 110-111. Transistor 702 has its emitter connected to a first lead of a resistor 703 having its second input connected to positive voltage source Vcc supplied by base card 120. Positive supply voltage Vcc is also connected to the anode of a first diod 704 which has its cathode connected to the anode of a second diode 705 having its cathode connected either to base of transistor 702 and to a first lead of a resistor 706. Resistor 706 has its second lead connected either to AN2-B lead 111 (since transformer 225 is not required) and to lead 216. Capacitor 701 has a first lead connected to AN2-A lead 110 and a second lead connected either to the collector of transistor 702 and to lead 208. Therefore, transistor 702 provides telephone set 222 via leads 208-216 with DC current, which value being closely dependent on the value of resistor 703 and approximately equal to 0.7 Volt/R, where R is the value of the latter resistor.

In the case when the base circuit (and therefore the personal system to which is connected to base circuit 120) must be isolated from either the PSTN and the telephone set 222, transformer 225 and a local feeder circuit 219 providing a galvanic isolation between base card 120 and telephone 222 are required. Such a local feeder circuit is shown with respect to FIG. 7B which uses a DC/DC converter based upon an oscillator circuit and a third transformer 712. The oscillator circuit includes an integrated circuit of the type 555 well known by the skilled man which provides a squared wave signal at its output lead 3. The squared wave signal is used to control a NPN transistor 713 having its emitter connected to ground and its collector connector a first lead of primary winding of transformer 712, a second lead of which being connected to positive supply voltage Vcc (12 Volts). The secondary winding of transformer 712 therefore provides an AC signal which is rectified by means of a diod 730 and filtered by a capacitor 711 and which can be used for supplying DC current source based on transistor 702 and described above.

More particularly, in the preferred embodiment of the invention, integrated circuit 555 has its first pin connected to ground potential, its second and sixth pins connected to a first lead of a resistor 716 having a second lead connected to the positive supply voltage Vcc, a third lead connected to the base of transistor 713 via a resistor 718 for limiting the current through the latter base, a fourth pin which is used as an inhibit control lead under control of base card 120. Integrated circuit 555 has its fifth pin connected to ground via a capacitor 719 and its seventh pin connected to the first lead of resistor 716 via a resistor 717 and, at last, its eighth pin connected to the positive supply voltage.

A capacitor 714 is connected between the first lead of primary winding of transformer 712 and ground potential. Pins 6 and 2 of integrated circuit NE 555 are also connected to ground potential via a capacitor 715. A capacitor 720 is connected between positive voltage source Vcc and ground for decoupling purpose.

Transformers 225 and 712 should be chosen to provide the required galvanic isolation. For instance, in the case of a coupler designed to be connected to the United Kindom PSTN, a 3 Kvolt isolation is required.

In the following table is more particularly described some parameters which are stored into RAM 143 during the initialization phase and which characterized a given PSTN. The parameter below are indicated with respect to two different examples, i.e. France and Germany.

TABLE

| PARAMETER | FR | DE |
|---|---|---|
| RING | | |
| Min Freg | 18 Hz | 20.5 Hz |
| Max Freg | 60 Hz | 57.5 Hz |

TABLE-continued

| PARAMETER | FR | DE |
|---|---|---|
| RI glitch at state 0 Max Value | 2 ms | 5 ms |
| RI State 2 Min Value | 60 Hz | 57.5 Hz |
| DIALING | | |
| DTMF-Global Level DTMF | −4 dBm | −4 dBm |
| DTMF Interdigit Value | 70 ms | 2 ms |
| PULSE-Delay between Dial loop and 1st digit | 25 ms | 0 ms |
| Delay between Dial loop OFF and last digit | 40 ms | 0 ms |
| Break duration | 60 Hz | 60 ms |
| Make duration | 33 ms | 40 ms |
| Interdigit delay | 0.9 sec | 1.1 sec |
| AUTO CALL V25 bis | | |
| Pause duration after line Seize | 0 | 3 sec |
| CRN/CRI indicator | CRB only | CRI only |
| MODEM MANAGEMENT | | |
| Guard Tone Xmit | yes | No |
| Nominal Xmit level | −10 dBm | −7 dBm |
| Auto Disconnect on RD notactive | 189 sec | 120 sec |
| TONE DETECTION | | |
| Duration of Dial Tone Analysis | 1.3 sec | 0 |
| Busy tone Min duration | 200 ms | 0 |
| Busy tone Max duration | 600 ms | 0 |
| FILTER SELECTION | | |
| Dial Tone Filter selection | 325–480 Hz | 0 |
| Busy Tone Filter selection | 400–480 Hz | 0 |

We claim:
1. Coupling device (150) for allowing the connection of a DCE which is connected to Data circuit terminating equipment DTE to a given Public Switched Telephone Network PSTN and to a local telephone set (222) characterized in that it includes a circuit means (219) for providing said local telephone set (222) with DC current; and a first switching means for interconnecting the circuit means to the local telephone set, said first switching means responsive to a control signal, from said DCE, which places the first switching means in a first state which allows vocal messages to be transmitted from the telephone set via the DCE to the DTE and from the DTE via the DCE to the local telephone set.

2. Coupling device according to claim 1 or 2 characterized in that it further includes:
   a first transformer (218) for performing a galvanic isolation between said DTE and said PSTN,
   a second switching means (200) for performing the connection of said telephone set (222) to either said PSTN or said DTE according to control signals (100, 112) received from said DCE
whereby said telephone set is used for exchanging voice messages with said PSTN or said DTE.

3. Coupling device according to claim 2 characterized in that the circuit means further includes:
   a current source (702, 703, 704, 705, 706) connected to a voltage source received from said DCE and for providing said telephone set with DC current.

4. Coupling device according to claim 2 characterized in that it includes:
   a second transformer (225) for providing a galvanic isolation between said DCE and said telephone set (222),
   a DC/DC converter connected to a voltage source received from said DCE and for providing said telephone set with DC current while achieving galvanic isolation between said voltage current (Vcc) and said telephone set (222).

5. Coupling device according to claim 4 characterized in that said DC/DC converter further includes:

an oscillator supplied by said voltage source (Vcc) for providing a oscillating control signal, switching means (713) controlled by said oscillating signal, a third transformer (712) drove by said switching means (713) for providing a AC voltage at its secondary winding, rectifying means (730) for providing a DC voltage source, a current source (702, 703, 704, 705) for providing said telephone set (222) with DC current source.

6. Data Circuit Terminating equipment DCE (120) for the connection of a Data Terminating Equipment (DTE) to a Public Switched Telephone Network (PSTN) and to a local telephone set (222) characterized in that it includes a coupling device (150) including the electronic components matching the electric requirements of a given PSTN and having a first plug (202,203) for the connection to said PSTN and a second plug for the connection to said local telephone set (213, 220), said coupler device (150) further including means for providing said telephone set (222) with DC current; and a first relay switch positioned to a first state which causes vocal messages to be transmitted or received between said telephone set (222) and said DTE.

7. DCE according to claim 6 characterized in that said coupling device further includes a first transformer (218) for performing a galvanic isolation between said DTE and said PSTN, switching means (200, 201) for performing the connection of said telephone set (222) to either said PSTN or said DTE according to control signals (100, 112) received from said DCE whereby said telephone set is used for exchanging voice messages with said PSTN or said DTE.

8. DCE according to claim 7 characterized in that said coupling device further includes:

a current source (702, 703, 704, 705, 706) connected to a voltage source received from said DCE and for providing said telephone set with DC current.

9. DCE according to claim 8 characterized in that said coupling device includes:

a second transformer (225) for providing a galvanic isolation between said DCE and said telephone set (222), a DC/DC converter connected to a voltage source received from said DCE and for providing said telephone set with DC current while achieving galvanic isolation between said voltage current (Vcc) and said telephone set (222).

10. Data Circuit Terminating equipment DCE (120) for the connection of a Data Terminating Equipment (DTE) to a Public Switched Telephone Network (PSTN) and to a local telephone set (222) characterized in that it includes means (130) for removably connecting a coupling device (150) including the electronic components matching the electric requirements of a given PSTN, said coupler device (150) having a first plug (202, 203) for the connection to said PSTN and a second plug (213, 220) for the connection to said local telephone set (222), said coupling device (150) further including means for providing said telephone set (222) with DC current, whereby vocal messages can be transmitted and received between said DTE and said telephone set (222).

11. DCE according to claim 10 characterized in that said coupling device further includes a first transformer (218) for performing a galvanic isolation between said DTE and said PSTN, switching means (200, 201) for performing the connection of said telephone set (222) to either said PSTN or said DTE according to control signals (100, 112) received by said DCE whereby said telephone set is used for exchanging voice messages with said PSTN or said DTE.

12. DCE according to claim 10 characterized in that said coupling device further includes:

a current source (702, 703, 704, 705, 706) connected to a voltage source received from said DCE and for providing said telephone set with DC current.

13. DCE according to claim 10 characterized in that said coupling device includes:

a second transformer (225) for providing a galvanic isolation between said DCE and said telephone set (222), a DC/DC converter connected to a voltage source received from said DCE and for providing said telephone set with DC current while achieving galvanic isolation between said voltage current (Vcc) and said telephone set (222).

14. DCE according to any one of claims 6–13 characterized in that it consists in a DCE interface card to be included or plugged into a workstation.

15. In a communications network having a Public Switched Telephone Network PSTN interconnecting one or more stations, with each station consisting of a Data circuit terminating equipment DTE coupled to a DCE and a telephone set, a coupling device for allowing communications between stations via the PSTN and communications between the telephone set in each station, via the DCE and the DTE in each station comprising:

a first circuit means for selectively providing said telephone set with dc current;

a first switching means responsive to a first control signal which places the first switching means in a first state; said first state connecting the telephone set to the first circuit means to cause vocal messages to be transmitted to and receive from the DTE connected to said DCE, or in a second state to disconnect the telephone set from said first circuit means; and a second switching means coupled to the first switching means; said second switching means operatively responsive to a second control signal which places the second switching means in a third state which connects the DCE to the PSTN.

16. The coupling device set forth in claim 15 further including a storage means for storing a coupler identification number representative of the PSTN to which said coupling device is to be connected.

17. The coupling device of claim 16 further including a controller for forwarding the identification number to the DCE under control of signals provided by said DCE.

* * * * *